(12) United States Patent
Henning et al.

(10) Patent No.: US 8,420,748 B2
(45) Date of Patent: Apr. 16, 2013

(54) PROCESS FOR PREPARING BRANCHED SI-H FUNCTIONAL POLYSILOXANES AND USE THEREOF FOR PREPARING LIQUID SIC- OR SIOC-LINKED, BRANCHED MODIFIED ORGANOMODIFIED POLYSILOXANES

(75) Inventors: Frauke Henning, Essen (DE); Wilfried Knott, Essen (DE); Michael Ferenz, Essen (DE)

(73) Assignee: Evonik Goldschmidt GmbH, Essen (DE)

( * ) Notice: Subject to any disclaimer, the term of this patent is extended or adjusted under 35 U.S.C. 154(b) by 0 days.

(21) Appl. No.: 13/288,539

(22) Filed: Nov. 3, 2011

(65) Prior Publication Data

US 2012/0046486 A1    Feb. 23, 2012

Related U.S. Application Data

(63) Continuation of application No. 12/547,109, filed on Aug. 25, 2009, now Pat. No. 8,138,294.

(30) Foreign Application Priority Data

Aug. 27, 2008  (DE) .................. 10 2008 041 601

(51) Int. Cl.
| | |
|---|---|
| C08G 77/08 | (2006.01) |
| C08G 77/04 | (2006.01) |
| C08G 77/06 | (2006.01) |
| C08G 77/12 | (2006.01) |
| C08F 283/00 | (2006.01) |

(52) U.S. Cl.
USPC .............. 525/479; 528/10; 528/12; 528/23

(58) Field of Classification Search .................. None
See application file for complete search history.

(56) References Cited

U.S. PATENT DOCUMENTS

| | | | |
|---|---|---|---|
| 2,758,124 A | 8/1956 | Schwenker et al. | |
| 3,694,405 A * | 9/1972 | Litteral | 528/23 |
| 4,222,952 A * | 9/1980 | Vick | 556/462 |
| 4,508,845 A * | 4/1985 | Dromard et al. | 502/159 |
| 4,631,208 A | 12/1986 | Westall | |
| 5,013,808 A | 5/1991 | Piskoti | |
| 5,039,761 A | 8/1991 | Ono et al. | |
| 5,306,737 A * | 4/1994 | Burkhart et al. | 521/112 |
| 5,430,166 A | 7/1995 | Klein et al. | |
| 5,455,367 A | 10/1995 | Klein et al. | |
| 5,475,127 A | 12/1995 | Klein et al. | |
| 5,486,590 A * | 1/1996 | Cabasso et al. | 528/23 |
| 5,494,979 A * | 2/1996 | Ebbrecht et al. | 525/479 |
| 5,614,603 A * | 3/1997 | Harkness et al. | 528/14 |
| 5,773,548 A | 6/1998 | Schickmann et al. | |
| 5,965,683 A | 10/1999 | Nye et al. | |
| 5,973,068 A | 10/1999 | Yamaya et al. | |
| 6,124,369 A * | 9/2000 | Kudo et al. | 521/112 |
| 6,211,322 B1 * | 4/2001 | Dohler et al. | 528/15 |
| 6,291,622 B1 | 9/2001 | Drose et al. | |
| 6,307,082 B1 | 10/2001 | Klein et al. | |
| 6,730,749 B1 | 5/2004 | Burkhart et al. | |
| 6,790,451 B2 | 9/2004 | Nakanishi | |
| 6,809,053 B2 * | 10/2004 | Nakayama et al. | 502/24 |
| 6,858,663 B2 | 2/2005 | Knott et al. | |
| 7,018,458 B2 | 3/2006 | Knott et al. | |
| 7,125,585 B2 | 10/2006 | Dudzik et al. | |
| 7,157,541 B2 | 1/2007 | Knott et al. | |
| 7,196,153 B2 * | 3/2007 | Burkhart et al. | 528/23 |
| 7,625,991 B2 * | 12/2009 | Angeletakis et al. | 528/29 |
| 2004/0054114 A1 | 3/2004 | Mayorga et al. | |
| 2004/0147703 A1 * | 7/2004 | Burkhart et al. | 528/25 |
| 2004/0176561 A1 | 9/2004 | Janeiro | |
| 2005/0032951 A1 | 2/2005 | Bechthold et al. | |
| 2005/0136269 A1 * | 6/2005 | Doehler et al. | 428/447 |
| 2006/0142516 A1 | 6/2006 | Plehiers et al. | |
| 2006/0155089 A1 | 7/2006 | Ferenz et al. | |
| 2006/0155090 A1 | 7/2006 | Ferenz | |
| 2006/0188455 A1 | 8/2006 | Ferenz et al. | |
| 2006/0188456 A1 | 8/2006 | Ferenz et al. | |
| 2006/0241270 A1 | 10/2006 | Burkhart et al. | |
| 2007/0043193 A1 | 2/2007 | Henning et al. | |
| 2007/0049717 A1 | 3/2007 | Knott et al. | |
| 2007/0059539 A1 | 3/2007 | Doehler et al. | |
| 2007/0100153 A1 | 5/2007 | Brueckner et al. | |

(Continued)

FOREIGN PATENT DOCUMENTS

| | | |
|---|---|---|
| DE | 1125180 | 3/1962 |
| DE | 3716372 A1 | 11/1988 |

(Continued)

OTHER PUBLICATIONS

Purolite C150 ion exchange resin Material Safety Data Sheet, 2011, 8 pages.*

(Continued)

*Primary Examiner* — Robert S Loewe
(74) *Attorney, Agent, or Firm* — Scully, Scott, Murphy & Presser, P.C.

(57) ABSTRACT

The invention provides a process for preparing liquid, branched SiH-functional siloxanes by reacting a mixture of one or more low molecular weight SiH-functional siloxanes, one or more low molecular weight SiH-free siloxanes, one or more tetraalkoxysilanes, and optionally one or more trialkoxysilanes with addition of water and in the presence of a Brønsted-acidic ion exchanger, which is characterized in that the reaction is performed in one process step.

15 Claims, No Drawings

U.S. PATENT DOCUMENTS

| | | | |
|---|---|---|---|
| 2007/0128143 A1 | 6/2007 | Gruning et al. |
| 2007/0184006 A1 | 8/2007 | Ferenz et al. |
| 2007/0207176 A1 | 9/2007 | Kamei et al. |
| 2007/0287765 A1 | 12/2007 | Busch et al. |
| 2008/0027202 A1 | 1/2008 | Ferenz et al. |
| 2008/0064782 A1 | 3/2008 | Doehler et al. |
| 2008/0125503 A1 | 5/2008 | Henning et al. |
| 2008/0153934 A1 | 6/2008 | Neumann et al. |
| 2008/0153992 A1 | 6/2008 | Knott et al. |
| 2008/0153995 A1 | 6/2008 | Knott et al. |
| 2008/0305065 A1 | 12/2008 | Ferenz et al. |
| 2009/0010603 A1 | 1/2009 | Sugioka et al. |
| 2009/0030097 A1 | 1/2009 | Knott et al. |
| 2009/0043001 A1* | 2/2009 | Bruckner et al. ............ 521/110 |
| 2009/0062459 A1 | 3/2009 | Thum et al. |
| 2010/0029587 A1 | 2/2010 | Brueckner et al. |
| 2010/0031852 A1 | 2/2010 | Herrwerth et al. |
| 2010/0034765 A1 | 2/2010 | Herrwerth et al. |
| 2010/0041910 A1 | 2/2010 | Schubert et al. |
| 2010/0056649 A1 | 3/2010 | Henning et al. |
| 2010/0071849 A1 | 3/2010 | Knott et al. |
| 2010/0081763 A1 | 4/2010 | Meyer et al. |
| 2010/0081781 A1 | 4/2010 | Schubert et al. |
| 2010/0105843 A1 | 4/2010 | Knott et al. |
| 2010/0113633 A1 | 5/2010 | Henning et al. |
| 2010/0168367 A1 | 7/2010 | Schubert et al. |
| 2010/0210445 A1 | 8/2010 | von Rymon Lipinski et al. |

FOREIGN PATENT DOCUMENTS

| | | |
|---|---|---|
| DE | 102005004676 A1 | 8/2006 |
| EP | 0381318 B1 | 10/1993 |
| EP | 0675151 A1 | 10/1995 |
| EP | 0610818 B1 | 6/1997 |
| EP | 0967236 B1 | 11/2000 |
| EP | 1050553 A1 | 11/2000 |
| EP | 1439200 A1 | 7/2004 |
| EP | 1520870 A1 | 4/2005 |
| EP | 1010714 B1 | 4/2006 |
| EP | 1829524 A2 | 9/2007 |
| WO | WO2008074565 A1 | 6/2008 |
| WO | WO2010063531 | 6/2010 |

OTHER PUBLICATIONS

Eaborn, C., "Organosilicon Compounds", 1960, pp. 167-218, Butterworths Scientific Publications, London.

* cited by examiner

PROCESS FOR PREPARING BRANCHED SI-H FUNCTIONAL POLYSILOXANES AND USE THEREOF FOR PREPARING LIQUID SIC- OR SIOC-LINKED, BRANCHED MODIFIED ORGANOMODIFIED POLYSILOXANES

CROSS REFERENCE TO RELATED APPLICATION

This application is a continuation of U.S. patent application Ser. No. 12/547,109, filed Aug. 25, 2009 the entire content and disclosure of which is incorporated herein by reference.

FIELD OF THE INVENTION

The invention relates to a process for preparing liquid organomodified polysiloxanes branched in the siloxane chain, in which a branched polysiloxane having terminal and/or pendant SiH functions is prepared in only one process step and functionalized further with organic compounds. The present invention also relates to branched organomodified polysiloxanes prepared by this process and to the use thereof.

BACKGROUND OF THE INVENTION

According to the prior art, polyorganosiloxanes are prepared by hydrolysis and condensation proceeding from methylchlorohydrosilanes with mixed substitution. A direct hydrolytic condensation of hydrogen-containing silanes, for example dimethylmonochlorosilane or methyldichlorosilane, is described, for example, in U.S. Pat. No. 2,758,124. In this prior art method, the siloxane phase which separates during the course of hydrolysis is removed from the water phase comprising hydrochloric acid. Since this process is prone to gelation of the hydrosiloxanes, DE 11 25 180 describes an improved process utilizing an organic auxiliary phase in which the hydrosiloxane formed is dissolved as a separate phase in an organic solvent and, after removal from the acidic water phase and removal of the solvent by distillation, is resistant to gelation. A further process improvement with regard to minimized use of solvent is described by EP 0 967 236. This prior art reference discloses that at first only small amounts of water should be used in the hydrolytic condensation of the organochlorosilanes, such that, in the first step, hydrogen chloride is driven out in gaseous form and can be supplied as a material of value directly for further uses.

Branched organomodified polysiloxanes can be described by a multitude of structures. Generally, a distinction has to be drawn between a branch or crosslink which is introduced via the organic substituents, and a branch or crosslink within the silicone chain. Organic crosslinkers for forming siloxane skeletons bearing SiH groups are, for example, α,ω-unsaturated diolefins, divinyl compounds or diallyl compounds, as described, for example, in U.S. Pat. No. 6,730,749 or EP 0 381 318. This crosslinking by platinum-catalyzed hydrosilylation, which follows downstream of the equilibration, means an additional process step in which both intramolecular bond formation and intermolecular bond formation can take place. The product properties are additionally strongly influenced by the different reactivities of the low molecular weight organic difunctional compounds which tend to form peroxide.

Multiple crosslinking of the silicone block of an organomodified polysiloxane with the organic block copolymer can be effected in various ways. EP 0 675 151 describes the preparation of a polyethersiloxane by hydrosilylation of a hydrosiloxane with a deficiency of hydroxy-functional allyl polyether, in which unconverted SiH functions are bonded with addition of sodium methoxide to the hydroxyl groups of the polyether substituents via an SiOC bond. The increase in molar mass leads to a wide scatter in the product properties, for example the viscosity. A similar approach to the formation of branched systems is described by U.S. Pat. No. 4,631,208, in which hydroxy-functional polyethersiloxanes are crosslinked by means of trialkoxysilanes. The two methods lead to intermolecular crosslinking of the polyethersiloxanes with difficult control of the increase in molar mass and associated, unforeseeable viscosity rises. When the aforementioned prior art methods are pursued, branching within the siloxane moiety at constant molar mass is not obtained, but rather crosslinking to form macromolecular multiblock copolymers is obtained.

Branching within the siloxane chain therefore has to be effected as early as in the preparation of the hydrosiloxane, in order to avoid the described disadvantages of crosslinking. Branches within the siloxane chain require the synthetic incorporation of trifunctional silanes, for example trichlorosilanes or trialkoxysilanes.

As is known to those skilled in the art, the hydrolysis rate of the organochlorosilanes rises in the following sequence (C. Eaborn, *Organosilicon Compounds*, Butterworths Scientific Publications, London 1960, p. 179)

$$SiCl_4 > RSiCl_3 >> R_2SiCl_2 > R_3SiCl.$$

In the hydrolysis and condensation reactions of tetra- and trichlorosilanes, there is therefore an increased tendency to form highly crosslinked gels compared to the slower hydrolysis and condensation reactions of difunctional and monofunctional organochlorosilanes. The established processes for hydrolysis and condensation of dichloro- and monochlorosilanes are therefore not immediately applicable to tetra- and trichlorosilanes, and it is instead necessary to take alternative routes via multistage processes.

Building on this finding, the preparation of monobranched hydrosiloxanes by incorporation of not more than one trifunctional monomer per siloxane chain also has to be performed in two stages according to the prior art. In a first step, a trifunctional, low molecular weight hydrosiloxane is prepared by hydrolysis and condensation from 1,1,3,3-tetramethyldisiloxane and methyltriethoxysilane, as taught, for example, by DE 37 16 372. Only in a second step can an equilibration with cyclic siloxanes to higher molecular weights be effected, as stated by DE 10 2005 004676. For further reaction—and therefore not until in a third step—the monobranched hydrosiloxane thus prepared can be provided with organic substituents by methods known per se for functionalization of siloxane compounds having SiH groups.

For the synthesis of polybranched hydrosiloxanes which, by definition, have more than one tetrafunctional or trifunctional monomer per siloxane chain, two-stage syntheses can also be found in the prior art.

One possibility, described in U.S. Pat. No. 6,790,451, consists in the preparation of a copolymer from trichloromethylsilane or trialkoxymethylsilane with hexamethyldisiloxane or trimethylchlorosilane, also referred to there as MT polymer, which is equilibrated in a second step together with a polydimethyl-(methylhydro)siloxane copolymer. The preparation of such MT polymers requires the use of strong bases or strong acids, in some cases in combination with high reaction temperatures, and gives rise to prepolymers of such high viscosity that their neutralization is considerably hindered, and thus further processing to end products of constant composition and quality is significantly restricted.

According to EP 0 675 151, the hydrolysis and condensation of the SiH-free, branched silicone polymer is first performed in xylene, and, in a second step, the equilibration with methylhydropolysiloxane leads to the branched hydrosiloxane. Here too, two process steps are absolutely necessary, in which the SiH functions are not introduced until the second step.

EP 0 610 818 B1 describes a process for preparing SiH-functional silicone resins proceeding from tetramethyldisiloxane and tetraalkoxysilanes, which are hydrolyzed and condensed using considerable amounts (for example 48 percent by weight of the reaction mixture) of an aqueous-alcoholic hydrochloric acid solution which contains at least 30% by weight of an alcohol and at least 5% by weight of an inorganic acid. The SiH-functional silicone resin thus obtained has to be isolated by extraction with an organic solvent.

EP 1 010 714 B1 describes a method for preparing branched SiH-functional solid silicone resins, in which the solvent used is a high-boiling mixture of alkanes. Although the amounts of water and acidic equilibration catalyst used are smaller than in EP 0 610 818 B1, degradation of the SiH functions used is unavoidable by this prior art method. As Examples 2 and 3 adduced there show, between 10 and 20 mol % of the dimethylhydrosiloxy units used are degraded during the reaction to non-SiH-functional dimethylsiloxy units.

EP 1 050 553 A1 describes a method for preparing branched SiH-functional crosslinkers, in which methyltriethoxysilane, tetramethyldihydrosiloxane and dimethylhydrochlorosilane react with one another in the presence of approx. 20 percent by weight of water, in which the hydrochloric acid released in the hydrolysis of the chlorosilane functions as a Brønsted-acidic equilibration catalyst. As disclosed by Example 1 adduced there, less than 50% of the SiH equivalents used are present in the product.

According to EP 1 829 524, polybranched SiH-functional organopolysiloxanes are used for surface treatment of cosmetic powders. The organopolysiloxanes described there are prepared proceeding from alkoxysilanes and SiH-functional siloxanes by hydrolysis and condensation. The catalyst used is 5 percent by weight of concentrated sulphuric acid. The high amount of acid which, remains in the product, would lead to storage instability and gelation, has to be removed by washing with water after the reaction has ended. This step likewise includes a phase separation and leads to the occurrence of acidic wastewater which has to be disposed of.

SUMMARY OF THE INVENTION

The present invention provides a simple one-stage process for preparing branched hydrosiloxanes, without degrading the SiH functions which have been introduced by the starting materials in side reactions, while dispensing with the use of aliphatic and/or aromatic solvents to form an additional auxiliary phase.

Surprisingly, it has now been found that condensation and equilibration of SiH-functional siloxanes with tetraalkoxysilanes and, optionally with trialkoxysilanes, is possible under hydrolytically acidic conditions in only a single step with very substantial retention of SiH functions introduced. This result is completely surprising to a person skilled in the art, since neither the described gelation tendency of trifunctional silanes, nor the side reaction of an acid-induced dehydrogenative SiH degradation (C. Eaborn, *Organosilicon Compounds*, Butterworths Scientific Publications, London 1960, p. 200) are noticeably troublesome.

The present invention therefore provides a process for preparing a branched SiH-functional siloxane liquid at a temperature of 25° C. and a pressure of 101 325 Pa utilizing a single step process which includes reacting a mixture comprising
a) one or more SiH-functional siloxanes,
b) one or more SiH function-free siloxanes and
c) one or more tetraalkoxysilanes, and optionally
d) one or more trialkoxysilanes,
in the presence of water and at least one solid, Brønsted-acidic catalyst selected from an acidic ion exchanger.

The present invention also relates to the resultant hydrosiloxanes prepared by the above mentioned single step, e.g., one step, process.

The present invention also provides for the use of the hydrosiloxanes thus prepared for preparing organomodified polysiloxanes branched in the siloxane chain, and the thus prepared organomodified polysiloxanes branched in the siloxane chain, and their use as interface-active silicone surfactants.

The inventive branched, interface-active silicone surfactants can be used in a wide variety of different applications including, for example as polyurethane foam stabilizers, as defoamers, devolatilizers, pigment wetting agents or dispersing additives for production of homogeneous, storage-stable pastes, colors, varnishes, coats, coatings or paints. In addition, the inventive branched silicone surfactants can be used in silicone separation coatings and silicone sealants, for textile coating, as an additive in cleaning compositions, for example as a washing composition additive or as an additive in aqueous and nonaqueous separating agent formulations.

DETAILED DESCRIPTION OF THE INVENTION

As stated above, the present invention provides a single step process for preparing branched Si—H functional polysiloxanes and the use thereof for preparing liquid, SiC- or SiOC-linked branched organomodified polysilioxanes.

The process according to the invention has the advantage that branched SiH-functional siloxanes can be prepared in a single process step. The single step process of the invention also has the advantage that, in the course of conversion, the SiH functions, especially the terminal SiH functions, are lost only to a minor degree, if at all. Especially the lack of degradation of the terminal SiH functions (dimethylhydrosiloxy units), which is expected by a person skilled in the art, is surprising.

The single step process according to the invention also has the advantage that no phase separation is required, in the case of which, firstly, the aqueous auxiliary phase has to be disposed of as waste and, secondly, the product has to be purified by distilling off the nonpolar solvents used, for example toluene or xylene. The process according to the invention requires essentially a gentle distillative removal of the low-boiling reaction products, specifically of the alcohols which arise from the hydrolysis and condensation.

With regard to the quality and storage stability of the end products, the process according to the invention has the advantage that the branched hydrosiloxanes prepared in accordance with the invention and the conversion products manufactured therefrom have no, or barely any, gelation tendency and can thus be stored over a longer period of time, without the viscosity of the products varying significantly.

The process according to the invention for preparing branched SiH-functional siloxanes and the use thereof for preparing organomodified polysiloxanes branched in the siloxane chain, and the use thereof, are described by way of example hereinafter, without any intention that the invention be restricted to these illustrative embodiments. When ranges, general formulae or compound classes are specified below, these are intended to comprise not just the corresponding ranges or groups of compounds which are mentioned explicitly, but also all sub-ranges and sub-groups of compounds which can be obtained by selecting individual values (ranges) or compounds. When documents are cited in the context of the present description, their contents shall be incorporated fully into the disclosure-content of the present invention.

The different monomer units of the compounds specified in the formulae (siloxane chains or polyoxyalkylene chain) may have an alternating blockwise structure or be present in random distribution. The indices used in the formulae, especially the indices a, b, c and d, should be considered as statistical mean values. In the context of the present invention, the mean degree of branching k is understood to mean the ratio of M and $M^H$ units to T and Q units $(M+M^H)/(T+Q)$. The designation of the units corresponds to the internationally recognized nomenclature, as can also be found, for example, in Thieme Römpp Online, Georg Thieme Verlag, 2008. According to this nomenclature, $M=R_3SiO_{1/2}$, $D=R_2SiO_{2/2}$, $T=RSiO_{3/2}$ and $Q=SiO_{4/2}$, where R are organic radicals. $M^H$ denotes a unit in which one of the R radicals is a hydrogen atom. $D^H$ denotes a unit in which one of the R radicals is a hydrogen atom. The degree of branching is determined by forming the ratio of the area integrals of the peaks in a $^{29}$Si NMR spectrum which are assigned to particular units.

In the inventive process for preparing branched SiH-functional siloxanes liquid at a temperature of 25° C. and a pressure of 101 325 Pa, a mixture comprising
  a) one or more SiH-functional siloxanes,
  b) one or more SiH function-free siloxanes and
  c) one or more tetraalkoxysilanes, and optionally
  d) one or more trialkoxysilanes,
is converted in a single step in the presence of water and at least one solid, Brønsted-acidic catalyst selected from an acidic ion exchanger.

The process according to the invention preferably dispenses completely with the presence of solvents which are not miscible with water in equal parts by weight without phase separation. More particularly, in the process according to the invention, no alkanes or aromatic compounds are used as solvents.

It may be advantageous when, in the process according to the invention, instead of water, a mixture of water and one or more organic solvents miscible with water in equal parts by weight without phase separation is added. In this way, it is possible to achieve better compatibilization and hence better mixing of the water with the siloxanes and silanes. However, good mixing can also be achieved by adding the water with particularly good mechanical mixing or supplying it to the mixture of silanes and siloxanes in the form of vapor, for example by a bubbling steam into the mixture.

The organic solvents used, which are miscible with water in equal parts by weight without phase separation, are preferably alcohols, especially alcohols having 1 to 6 carbon atoms, preferably monohydric alcohols and more preferably methanol or ethanol, especially ethanol. Preference is given to adding such a large amount of this solvent that the water is entirely or partly homogenized in the reaction mixture. When a mixture of water and such a solvent, such as ethanol in particular, is used, the weight ratio of water to solvent in this mixture is preferably 1:1 to 10:1, more preferably 2:1 to 5:1.

The process according to the invention is preferably used to prepare hydrosiloxanes branched in the siloxane chain of the general formula (I)

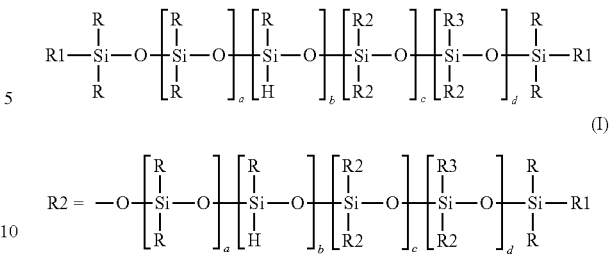

in which
  a is independently 0 to 500, preferably 1 to 300, more preferably 10 to 200,
  b is independently 0 to 60, preferably 0 to 30, more preferably >0, especially 1 to 15,
  c is independently 1 to 10, preferably 1 to 5,
  d is independently 0 to 10, preferably 0 or >0 to 5, more preferably 1 to 5,
  R is at least one radical from the group of linear, cyclic or branched, aliphatic or aromatic, saturated or unsaturated hydrocarbon radicals having 1 up to 20 carbon atoms, but is preferably a methyl radical,
  R1 is independently hydrogen or R,
  R3 is independently hydrogen, R or a heteroatom-substituted, functional, organic, saturated or unsaturated radical, preferably selected from the group of the alkyl, chloroalkyl, chloroaryl, fluoroalkyl, cyanoalkyl, acryloyloxyaryl, acryloyloxyalkyl, methacryloyloxyalkyl, methacryloyloxypropyl or vinyl radicals, more preferably a methyl, chloropropyl, vinyl or methacryloyloxypropyl radical,
with the proviso that, when b=0, R1=H, and that the mean number of the T and Q units per molecule is in each case not greater than 20, preferably not greater than 10, more preferably not greater than 5, the mean number of the D units per molecule is not greater than 2000, preferably not greater than 1000 and more preferably not greater than 500, and the mean number of the $D^H$ units per molecule is not greater than 100, preferably not greater than 60. Especially preferably, a>0.

The branched SiH-functional siloxanes obtained by the process according to the invention, preferably the branched SiH-functional siloxanes of the formula (I), may be those in which the SiH functions are purely in terminal positions, purely in pendant positions or in a mixture of terminal and pendant positions in the siloxane.

The SiH-functional siloxanes used may be those in which the SiH functions are purely in terminal positions, purely in pendant positions or in a mixture of terminal and pendant positions in the siloxane. The SiH-functional siloxanes used may, for example, be linear polymethylhydrosiloxanes, for example HMS-993 from Gelest Inc., linear polydimethylmethylhydrosiloxanes, for example HMS-031 and/or HMS-071 from Gelest Inc., linear α,ω-dihydropolydimethylsiloxanes, for example 1,1,3,3-tetramethyldisiloxane and/or 1,1,3,3,5,5-hexamethyltrisiloxane, relatively high molecular weight oligomers, for example DMS-H03 and/or DMS-H11 from Gelest Inc., cyclic polymethylhydrosiloxanes, for example tetramethylcyclotetrasiloxane or pentamethylcyclopentasiloxane, and cyclic polydimethylmethylhydrosiloxanes, for example heptamethylcyclotetrasiloxane and/or nonamethylcyclopentasiloxane, or mixtures thereof. The SiH-functional siloxanes used are more preferably 1,1,3,3-tetramethyldisiloxane, DMS-H03, HMS-993 (each from Gelest Inc.) and pentamethylcyclopentasiloxane.

The SiH function-free siloxanes used may, for example, be linear polydimethylsiloxanes, for example hexamethyldisiloxane, or cyclic polydimethylsiloxanes, for example octamethylcyclotetrasiloxane and/or decamethylcyclopentasiloxane. Preference is given to using hexamethyldisiloxane and decamethylcyclopentasiloxane.

In a preferred embodiment of the process according to the invention, one or more tetraalkoxysilanes and one or more trialkoxysilanes are used. In a particularly preferred embodiment of the process according to the invention, one or more tetraalkoxysilanes and no trialkoxysilanes are used.

The tetraalkoxysilanes used may in principle be all tetraalkoxysilanes, especially tetramethoxysilane, tetraethoxysilane or tetraisopropoxysilane, or condensates thereof. The tetraalkoxysilanes used may be those in which the alkoxy radicals are all the same, all are different or some are the same. Particular preference is given to the use of tetraethoxysilane.

When trialkoxysilanes are used in addition, it is possible in principle to use all trialkoxysilanes. The trialkoxysilanes used may be those in which the alkoxy radicals are all the same, all are different or some are the same. Particular preference is given to the use of triethoxysilanes, preferably alkyltriethoxysilanes, for example methyltriethoxysilane, ethyltriethoxysilane, n-propyltriethoxysilane, isobutyltriethoxysilane, pentyltriethoxysilane, hexyltriethoxysilane, octyltriethoxysilane, hexadecyltriethoxysilane, n-octa-decyltriethoxysilane, halogen-containing or pseudohalogen containing alkyltrialkoxysilanes, especially alkyltriethoxysilanes, for example chloropropyltriethoxysilane, tridecafluoro-1,1,2,2-tetrahydrooctyltriethoxysilane, nonafluoro-1,1,2,2-tetrahydrohexyltriethoxysilane, 3-cyanopropyltriethoxysilane, trialkoxysilanes, especially triethoxysilanes with functional groups, for example 3-methacryloyloxypropyltriethoxysilane, 3-mercaptopropyltriethoxysilane, 5-(bicycloheptenyl)triethoxysilane, phenyltriethoxysilane, (p-chloromethyl)phenyltriethoxysilane, N-(3-triethoxysilylpropyl)-4,5-dihydroimidazole or dihydro-3-[3-(triethoxysilyl)propyl] furan-2,5-dione. It may be advantageous when organically functionalized trialkoxysilanes are used as the branching unit (are introduced by equilibration).

Preference is given to using exclusively reactants a) to d) which are present in liquid form under standard conditions.

The proportions of chain-terminating trialkylsiloxy units, especially trimethylsiloxy units (M units) and/or dialkylhydrosiloxy units, especially dimethylhydrosiloxy units ($M^H$ units), of chain-extending dialkylsiloxy units, especially dimethylsiloxy units (D units) and/or alkylhydrosiloxy units, especially methylhydrosiloxy units ($D^H$ units), and of chain-branching siloxy units (Q units) and optionally of branching alkylsiloxy units (T units) and/or T units substituted by functional groups, can be varied over a wide range. The molar ratio of the sum total of M units and $M^H$ units to Q units is preferably from 4:1 to 1.8:1. When the molar amount of the Q units relative to the M or $M^H$ units is increased above this limiting ratio, undesired, macromolecular, highly crosslinked gels up to resins are obtained.

The reaction mixture can be obtained by any kind of mixing of the components. Preference is given to first mixing the SiH-functional siloxanes, the SiH function-free siloxanes, the tetraalkoxysilanes and, if appropriate, the trialkoxysilanes or the substituted trialkoxysilanes.

Preferably, after the starting materials have been mixed, i.e., the SiH-functional siloxanes, the SiH function-free siloxanes and the tetraalkoxysilanes and, if appropriate, trialkoxysilanes, at least one Brønsted-acidic catalyst for catalysis of the hydrolysis and condensation is added. The catalyst can be added directly to the reaction mixture in whole or in part, or be metered in during the reaction in any sequence.

Preference is given to first mixing the starting materials, then to add the catalyst and then to add the water or the aqueous mixture.

The acidic ion exchangers used may be the ion exchangers known from the prior art. In the process according to the invention, it is possible to use both natural ion exchangers, for example zeolites, montmorillonites, attapulgites, bentonites and other aluminium silicates, and synthetic ion exchangers. The latter are preferably solids (usually in grain form) with a three-dimensional, water-insoluble high molecular weight matrix based on phenol-formaldehyde resins or copolymers of styrene-divinylbenzene, into which numerous "anchor groups" of different acidity have been incorporated. More particularly, it is possible to use acidic aluminas or acidic ion exchange resins, for example the products known under the brand names Amberlite®, Amberlyst® or Dowex® and Lewatit®. The acidic ion exchanger used is more preferably a sulphonic acid ion exchange resin.

The acidic ion exchangers used in the process according to the invention are preferably those as described in EP 1 439 200. This document and the prior art documents cited therein are hereby incorporated as a reference and are considered to form part of the disclosure-content of the present invention.

It may be advantageous when, in the process according to the invention, the catalyst used comprises at least one acidic ion exchanger (catalyst 1) and at least one further, non-solid, Brønsted-acidic catalyst (catalyst 2), especially a liquid acid. The catalyst 2 used may be a mineral acid, preferably sulphuric acid and/or, preferably, an organic sulphonic acid, preferably trifluoromethanesulphonic acid. This catalyst mixture is preferably added directly to the reaction mixture. The catalyst used is preferably a mixture of trifluoromethanesulphonic acid and a sulphonic acid ion exchange resin, preferably Lewatit® K 2621 (Bayer Material Science). The catalyst mixture preferably has a mass ratio of catalyst 1 to catalyst 2 of 10:1 to 100:1. This mass ratio is preferred especially in the case of use of a Lewatit® catalyst as catalyst 1 and of trifluoromethanesulphonic acid as catalyst 2.

When the catalyst used comprises the two catalysts 1 and 2, it may be advantageous when catalyst 2 is added first, preferably fully, to the mixture of starting materials, then the water is added, and catalyst 1 is added only after the preferably complete addition of water. However, catalysts 1 and 2 may also both be added to the starting materials before the addition of the water.

In the process according to the invention, preferably such an amount of acidic catalyst is added to the reaction mixture that the sum total of the acidic catalysts used is from 0.01 to 20% by weight, more preferably from 0.05 to 10% by weight based on the sum total of the mass of starting materials used (i.e., sum of the SiH-functional siloxanes, of the SiH function-free siloxanes, of the tetraalkoxysilanes and, if appropriate, of the trialkoxysilanes). According to the type and concentration of the catalyst used, particular sub-ranges of this range may be preferred. Particular preference is given, for example, to the use of trifluoromethanesulphonic acid in amounts of from 0.05% by weight to 0.5% by weight. When the catalyst used is an ion exchange resin alone, the mass of catalyst used is preferably 3 to 10% by weight. When the catalyst used is a combination of mineral acid and/or organic sulphonic acid with an ion exchange resin, the mass of ion exchange resin used is preferably from 3 to 16% by weight.

In the process according to the invention, preferably 0.5 to 30 mol of water per mole of alkoxysilane used are used. For the hydrolysis and condensation, preferably 1 to 6 mol of water are used per mole of alkoxysilane. The water can be added in one step or preferably metered in over a longer period of time. Owing to the amount of water selected, a phase separation usually does not occur.

The reaction in the process according to the invention is preferably performed at a temperature of 0° C. to 100° C. Preference is given to effecting the reaction (simultaneous performance of hydrolysis, condensation and equilibration reactions) at a temperature of 20 to 60° C.

After the reaction has ended, the volatile by-products of the condensation can be removed, for example by gentle vacuum distillation. If required or desired, a neutralization can be effected, for example with a basic salt, preferably with sodium hydrogencarbonate.

The inventive chain-branched hydrosiloxanes thus obtained are preferably stable, clear, colorless liquids which preferably contain no or at least only minor proportions of volatile low molecular weight compounds. The SiH equivalents weighed in via the reactant mixture, i.e., measured before the reaction, and the SiH equivalents measured in the hydrosiloxanes prepared by the process according to the invention (i.e., after the reaction) are consistent within the accuracy of analysis, which demonstrates the very substantial retention of the SiH functions used. Inventive chain-branched hydrosiloxanes have preferably more than 95%, preferably more than 97%, of the theoretically possible hydrogen content (Si—H— hydrogen). The hydrogen content can be determined by gas volumetric means, once the hydrogen has been decomposed quantitatively by decomposing the SiH-containing material in alcoholic alkali solution (see also reaction equation in Eaborn, p. 200).

The process according to the invention makes it possible to prepare hydrosiloxanes branched in the siloxane chain, especially those of the formula (I). The hydrosiloxanes branched in the siloxane chain preferably have a viscosity, measured with a rotary viscometer of the Haake RV12 brand, at 25° C., of 10 to 1000 mPa*s, preferably of 20 to 500 and more preferably of 20 to 250 mPa*s. The branched hydrosiloxanes contain an average of preferably 1 to 10, more preferably 1 to 5, branching units (Q and T units). The inventive hydrosiloxanes branched in the siloxane chain can be used to prepare organomodified polysiloxanes branched in the siloxane chain.

In a preferred embodiment of the process according to the invention, organomodified polysiloxanes branched in the siloxane chain are prepared by full or partial reaction of the hydrosiloxanes branched in the siloxane chain prepared in accordance with the invention, preferably hydrosiloxanes of the formula (I), with compounds having at least one, preferably exactly one, double bond per molecule, by noble metal-catalysed, especially platinum-catalyzed, hydrosilylation. This reaction preferably affords copolymers of the general formula (II)

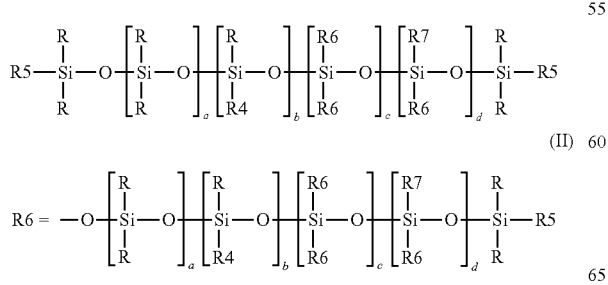

(II)

in which a is independently 0 to 500, preferably 1 to 300, more preferably 10 to 200, b is independently 0 to 60, preferably 0 to 30, more preferably >0, especially 1 to 15, c is independently 1 to 10, preferably 1 to 5, d is independently 0 to 10, preferably 0 or >0 to 5, with the proviso that the mean number of the T and Q units per molecule is in each case not greater than 20, preferably not greater than 10, the mean number of the D units per molecule is not greater than 2000, preferably not greater than 1000 and more preferably not greater than 500, and the mean number of the $D^H$ units per molecule is not greater than 100, preferably not greater than 50, R is at least one radical from the group of linear, cyclic or branched, aliphatic or aromatic, saturated or unsaturated hydrocarbon radicals having 1 up to 20 carbon atoms, but is preferably a methyl radical, R5 is independently R4 or R, R4 is an organic radical other than R or is R, and is more preferably R and/or —CH$_2$—CH$_2$—CH$_2$—O—(CH$_2$—CH$_2$O—)$_x$(CH$_2$—CH(R")O—)$_y$, —(SO)$_z$—R"

—CH$_2$—CH$_2$—O—(CH$_2$—CH$_2$O—)$_x$(CH$_2$—CH(R')O—)$_y$—R"

—CH$_2$—R$^{IV}$

—CH$_2$—CH$_2$—(O)$_{x'}$—R$^{IV}$

—CH$_2$—CH$_2$—CH$_2$—O—CH$_2$—CH(OH)—CH$_2$OH

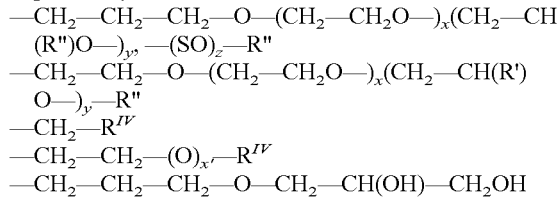

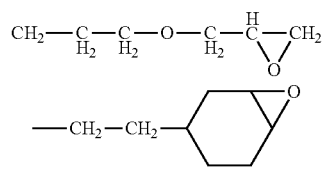

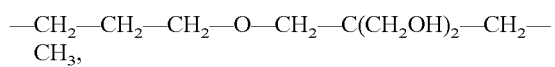

—CH$_2$—CH$_2$—CH$_2$—O—CH$_2$—C(CH$_2$OH)$_2$—CH$_3$, in which x is 0 to 100, preferably >0, especially 1 to 50, x' is 0 or 1, y is 0 to 100, preferably >0, especially 1 to 50, z is 0 to 100, preferably >0, especially 1 to 10, R' is an optionally substituted alkyl or aryl group, substituted for example by alkyl radicals, aryl radicals or haloalkyl or haloaryl radicals, and having 1 to 12 carbon atoms, and R" is a hydrogen radical or an alkyl group having 1 to 4 carbon atoms, a —C(O)—R'" group where R'" alkyl radical, a —CH$_2$—O—R' group, an alkylaryl group, for example a benzyl group, the —C(O)NH—R' group, R$^{IV}$ is an optionally substituted hydrocarbon radical, substituted for example by halogens, and having 1 to 50, preferably 9 to 45 and more preferably 13 to 37 carbon atoms, SO is a styrene oxide radical —CH(C$_6$H$_5$)—CH$_2$—O— or —CH$_2$—CH(C$_6$H$_5$)—O—, R$^7$ may be R, R4 and/or a functional, organic, saturated or unsaturated radical which is substituted by heteroatoms and is selected from the group of the alkyl, chloroalkyl, chloroaryl, fluoroalkyl, cyanoalkyl, acryloyloxyaryl, acryloyloxyalkyl, methacryloyloxyalkyl, methacryloyloxypropyl or vinyl radical, with the proviso that at least one substituent from R4, R5 and R7 is not R. The different monomer units of the siloxane chain and also of the polyoxyalkylene chain may have an alternating blockwise structure or be subject to a random distribution.

The noble metal-catalyzed hydrosilylation of the inventive branched hydrosiloxanes can be carried out, for example, as described in the prior art, for example in EP 1 520 870. Document EP 1 520 870 is hereby incorporated as reference and is considered to form part of the disclosure-content of the present invention.

The compounds used which have at least one double bond per molecule may, for example, be α-olefins, vinylpolyoxyalkylenes and/or allylpolyoxyalkylenes. Preference is given to using vinylpolyoxyalkylenes and/or allylpolyoxyalkylenes. Particularly preferred vinylpolyoxyalkylenes are, for example, vinylpolyoxyalkylenes having a molar mass in the range from 100 g/mol to 5000 g/mol, which may be formed from the monomers propylene oxide, ethylene oxide, butylene oxide and/or styrene oxide in blockwise or random distribution and which may be either hydroxy-functional or end-capped by a methyl ether function or an acetoxy function. Particularly preferred allylpolyoxyalkylenes are, for example, allylpolyoxyalkylenes having a molar mass in the range from 100 g/mol to 5000 g/mol, which may be formed from the monomers propylene oxide, ethylene oxide, butylene oxide and/or styrene oxide in blockwise or random distribution, and which may be either hydroxy-functional or end-capped by a methyl ether function or an acetoxy function. Particular preference is given to using, as the compounds which have at least one double bond per molecule, the α-olefins, allyl alcohol, 1-hexenol, vinylpolyoxyalkylenes and/or allylpolyoxyalkylenes specified in the examples, and also allyl glycidyl ether and vinylcyclohexene oxide.

In a further preferred embodiment of the process according to the invention, organomodified polysiloxanes branched in the siloxane chain are prepared by full or partial reaction of the hydrosiloxanes branched in the siloxane chain prepared in accordance with the invention, preferably hydrosiloxanes of the formula (I), with compounds having one hydroxyl group per molecule by Lewis acid-catalyzed dehydrogenative bond formation. The Lewis acid-catalyzed dehydrogenative bonding of hydroxy-functional compounds to the branched hydrosiloxanes prepared in accordance with the invention, especially those of the formula (I), can be carried out as described in the prior art. Preference is given to effecting the dehydrogenative bond formation as described in DE 10 2005 004 676, which is hereby incorporated as a reference and is considered to form part of the disclosure-content of the present invention.

The dehydrogenative bonding preferably affords copolymers of the general formula (III)

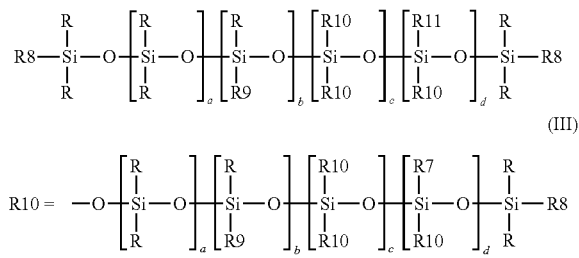

(III)

in which
a is independently 0 to 500, preferably 1 to 300, more preferably 10 to 200,
b is independently 0 to 60, preferably 0 to 30, more preferably >0, especially 1 to 15,
c is independently 1 to 10, preferably 1 to 5,
d is independently 1 to 10, preferably 0 or >0 to 5,
with the proviso that the mean number of the T and Q units per molecule is in each case not greater than 20, preferably not greater than 10, the mean number of the D units per molecule is not greater than 2000, preferably not greater than 1000 and more preferably not greater than 500, and the mean number of the $D^H$ units per molecule is not greater than 100, preferably not greater than 50, R is at least one substituent from the group of linear, cyclic or branched, aliphatic or aromatic, saturated or unsaturated hydrocarbon radicals having 1 up to 20 carbon atoms, preferably a methyl radical, all R radicals more preferably being a methyl radical, $R^8$ is an organic modification or R, more preferably R and/or
O—$(CH_2$—$CH_2O$—$)_x$—$(CH_2$—$CH(R')O$—$)_y$—$(SO)_z$—$R^V$
where x, y, z, R' and SO are each as defined for the formula (II) and $R^V$ is a linear, cyclic or branched, saturated or unsaturated alkyl radical optionally substituted by heteroatoms, R9 may be R and/or R8, R11 may be R, R8 and/or a functional, organic, saturated or unsaturated radical which is substituted by heteroatoms and is selected from the group of the alkyl, chloroalkyl, chloroaryl, fluoroalkyl, cyanoalkyl, acryloyloxyaryl, acryloyloxyalkyl, methacryloyloxyalkyl, methacryloyloxypropyl or vinyl radicals, with the proviso that at least one of the R8, R9 and R11 radicals is not R.

The hydroxy-functional compounds used are preferably hydroxy-functional polyoxyalkylenes, and also fatty alcohols or hydroxy-functional acrylates or methacrylates. Particularly preferred compounds are, for example, methylpolyoxyalkenols or butylpolyoxyalkenols with a molar mass in the range from 100 g/mol to 5000 g/mol, which may be formed from the monomers propylene oxide, ethylene oxide, butylene oxide and/or styrene oxide in blockwise or random distribution. Particular preference is given to using, as the hydroxy-functional compounds, the hydroxy-functional polyoxyalkylenes specified in the examples, and also fatty alcohols such as stearyl alcohol, or hydroxy-functional acrylates such as hydroxyethyl acrylate or hydroxypropyl acrylate.

By virtue of the use of the inventive hydrosiloxanes branched in the siloxane chain for preparing organomodified polysiloxanes branched in the siloxane chain, it is possible to obtain corresponding organomodified polysiloxanes branched in the siloxane chain, especially those of the formulae (II) or (III). These inventive organomodified polysiloxanes branched in the siloxane chain, or those prepared in accordance with the invention, can be used, for example, as interface-active silicone surfactants and in radiation-curing silicone coatings.

The organomodified and especially polyether-modified branched siloxanes (c+d≧1) of the present invention may find use in industrial applications alone or else in a blend with other unbranched organomodified siloxanes (c+d=0) as valuable interface-active ingredients. More particularly, the blend described in the invention permits the definition of a broad spectrum of action of such surfactants, which are used in the production of polyurethane foams, for example as foam stabilizers.

It is obvious that the blending of the organomodified and especially polyether-modified, branched siloxanes (c+d≧1) of the invention with unbranched siloxanes can afford mixtures which are valuable interface-active ingredients, but which, according to the mixing ratio, have a total of less than one branching unit per molecule (c+d<1). It is also possible to mix the organomodified and especially polyether-modified branched siloxanes (c+d≧1) of the present invention with silicon-free compounds, for example solvents, especially glycols or polyethers, in wide ranges. Such mixtures may also be valuable interface-active compositions. The mean molecular degree of branching determined by $^{29}Si$ NMR, by its nature, does not change in this case.

In the examples adduced below, the present invention is described by way of example, without any intention that the invention, whose breadth of application is evident from the entire description and the claims, be restricted to the embodiments specified in the examples.

The viscosities specified in the examples have been determined with a rotary viscometer of the Haake RV12 brand at 25° C. The mean degree of branching $k=(M+M^H)/(T+Q)$ was determined by forming the ratio of the particular area integrals of a $^{29}Si$ NMR spectrum.

Example 1

Inventive 16.53 g (0.079 mol) of tetraethoxysilane (>98%, obtainable from Fluka), 80.21 g of an α,ω-dihydropolydimethylsiloxane with a hydrogen content of 2.97 eq SiH/kg and 500.4 g of decamethylcyclopentasiloxane (obtainable from Gelest Inc.) were initially charged in a four-neck flask equipped with a precision glass stirrer, an internal thermometer, a dropping funnel and a distillation apparatus with stirring at 40° C., 0.35 ml of trifluoromethanesulphonic acid (obtainable from Sigma Aldrich) was added, and the mixture was stirred for 2 hours. Within 5 minutes, a mixture of 5.72 g of deionized water and 1.43 g of ethanol was added dropwise with stirring, and the mixture was stirred for one hour. After adding 37.0 g of the predried sulphonic acid cation exchange resin Lewatit® K 2621 (water content 10% by weight—determined based on the Karl-Fischer method), excess water and alcohol were distilled off in a water-jet pump vacuum of approx. 20 mbar at 40° C. for one hour. After the resin had been filtered off, the mixture was neutralized with 12.0 g of sodium hydrogencarbonate and filtered again. This gave a clear, colorless liquid with a viscosity of 131.9 mPa*s and a hydrogen content of 0.39 eq SiH/kg (theoretical value=0.40 eq SiH/kg). From the $^{29}Si$ NMR spectrum, a mean degree of branching k of 4.2 was calculated.

Example 2

Inventive 37.8 g (0.181 mol) of tetraethoxysilane (>98%, obtainable from Fluka), 163.0 g of an α,ω-dihydropolydimethylsiloxane with a hydrogen content of 2.97 eq SiH/kg and 492.6 g of decamethylcyclopentasiloxane (obtainable from Gelest Inc.) were initially charged in a four-neck flask equipped with a precision glass stirrer, an internal thermometer, a dropping funnel and a distillation apparatus with stirring at 40° C., 0.42 ml of trifluoromethanesulphonic acid (obtainable from Sigma Aldrich) was added and the mixture was stirred for 2 hours. Within 5 minutes, a mixture of 13.1 g of deionized water and 3.3 g of ethanol was added dropwise with stirring, and the mixture was stirred for one hour. After adding 42.4 g of the predried sulphonic acid cation exchange resin Lewatit® K 2621 (water content 10% by weight—determined based on the Karl-Fischer method), excess water and alcohol were distilled off in a water-jet pump vacuum of approx. 20 mbar at 40° C. for 3.5 hours. After the resin had been filtered off, the mixture was neutralized with 14.1 g of sodium hydrogencarbonate and filtered again. This gave a clear, colorless liquid with a viscosity of 49.9 mPa*s and a hydrogen content of 0.71 eq SiH/kg (theoretical value=0.72 eq SiH/kg). From the $^{29}Si$ NMR spectrum, a mean degree of branching k of 3.6 was calculated.

Example 3

Inventive 25.0 g (0.120 mol) of tetraethoxysilane (>98%, obtainable from Fluka), 21.5 g (0.120 mol) of methyltriethoxysilane (98%, obtainable from ABCR), 161.7 g of an α,ω-dihydropolydimethylsiloxane with a hydrogen content of 2.97 eq SiH/kg and 484.2 g of decamethylcyclopentasiloxane (obtainable from Gelest Inc.) were initially charged in a four-neck flask equipped with a precision glass stirrer, an internal thermometer, a dropping funnel and a distillation apparatus with stirring at 40° C., 0.42 ml of trifluoromethanesulphonic acid (obtainable from Sigma Aldrich) was added and the mixture was stirred for 2 hours. Within 5 minutes, a mixture of 15.1 g of deionized water and 3.8 g of ethanol was added dropwise with stirring, and the mixture was stirred for one hour. After adding 42.4 g of the predried sulphonic acid cation exchange resin Lewatit® K 2621 (water content 10% by weight—determined based on the Karl-Fischer method), excess water and alcohol were distilled off in a water-jet pump vacuum of approx. 20 mbar at 40° C. for 3.5 hours. After the resin had been filtered off, the mixture was neutralized with 14.1 g of sodium hydrogencarbonate and filtered again. This gave a clear, colorless liquid with a viscosity of 62.1 mPa*s and a hydrogen content of 0.71 eq SiH/kg (theoretical value=0.72 eq SiH/kg). From the $^{29}Si$ NMR spectrum, a mean degree of branching k of 3.0 was calculated.

Example 4

Inventive 37.6 g (0.180 mol) of tetraethoxysilane (>98%, obtainable from Fluka), 19.5 g of hexamethyldisiloxane (obtainable from Gelest Inc.), 81.1 g of an α,ω-dihydropolydimethylsiloxane with a hydrogen content of 2.97 eq SiH/kg and 555.2 g of decamethylcyclopentasiloxane (obtainable from Gelest Inc.) were initially charged in a four-neck flask equipped with a precision glass stirrer, an internal thermometer, a dropping funnel and a distillation apparatus with stirring at 40° C., 0.42 ml of trifluoromethanesulphonic acid (obtainable from Sigma Aldrich) was added and the mixture was stirred for 2 hours. Within 5 minutes, a mixture of 13.0 g of deionized water and 3.3 g of ethanol was added dropwise with stirring, and the mixture was stirred for one hour. After adding 42.4 g of the predried sulphonic acid cation exchange resin Lewatit® K 2621 (water content 10% by weight—determined based on the Karl-Fischer method), excess water and alcohol were distilled off in a water-jet pump vacuum of approx. 20 mbar at 40° C. for 3.5 hours. After the resin had been filtered off, the mixture was neutralized with 14.1 g of sodium hydrogencarbonate and filtered again. This gave a clear, colorless liquid with a viscosity of 51.2 mPa*s and a hydrogen content of 0.35 eq SiH/kg (theoretical value=0.36 eq SiH/kg). From the $^{29}$Si NMR spectrum, a mean degree of branching k of 6.8 was calculated.

Example 5

Inventive 37.9 g (0.182 mol) of tetraethoxysilane (>98%, obtainable from Fluka), 41.7 g of hexamethyldisiloxane (obtainable from Gelest Inc.), 46.5 g of a polymethylhydrosiloxane with a hydrogen content of 15.71 eq SiH/kg and 567.3 g of decamethylcyclopentasiloxane (obtainable from Gelest Inc.) were initially charged in a four-neck flask equipped with a precision glass stirrer, an internal thermometer, a dropping funnel and a distillation apparatus with stiffing at 40° C., 0.42 ml of trifluoromethanesulphonic acid (obtainable from Sigma Aldrich) was added and the mixture was stirred for 2 hours. Within 5 minutes, a mixture of 13.1 g of deionized water and 3.3 g of ethanol was added dropwise with stirring, and the mixture was stirred for one hour. After adding 42.4 g of the predried sulphonic acid cation exchange resin Lewatit® K 2621 (water content 10% by weight—determined based on the Karl-Fischer method), excess water and alcohol were distilled off in a water-jet pump vacuum of approx. 20 mbar at 40° C. for 3.5 hours. After the resin had been filtered off, the mixture was neutralized with 14.1 g of sodium hydrogencarbonate and filtered again. This gave a clear, colorless liquid with a viscosity of 51.5 mPa*s and a hydrogen content of 1.09 eq SiH/kg (theoretical value=1.09 eq SiH/kg). From the $^{29}$51 NMR spectrum, a mean degree of branching k of 7.0 was calculated.

Example 6

Inventive 27.6 g of partly hydrolysed tetraethoxysilane (Dynasylan® 40, SiO$_2$ content 41%, obtainable from Evonik Degussa GmbH), 169.1 g of an α,ω-dihydropolydimethylsiloxane with a hydrogen content of 2.97 eq SiH/kg and 511.0 g of decamethylcyclopentasiloxane (obtainable from Gelest Inc.) were initially charged in a four-neck flask equipped with a precision glass stirrer, an internal thermometer, a dropping funnel and a distillation apparatus with stiffing at 40° C., 0.42 ml of trifluoromethanesulphonic acid (obtainable from Sigma Aldrich) was added and the mixture was stirred for 2 hours. Within 5 minutes, a mixture of 1.4 g of deionized water and 0.4 g of ethanol was added dropwise with stirring, and the mixture was stirred for one hour. After adding 42.4 g of the predried sulphonic acid cation exchange resin Lewatit® K 2621 (water content 10% by weight—determined based on the Karl-Fischer method), excess water and alcohol were distilled off in a water-jet pump vacuum of approx. 20 mbar at 40° C. for 3.5 hours. After the resin had been filtered off, the mixture was neutralized with 14.1 g of sodium hydrogencarbonate and filtered again. This gave a clear, colorless liquid with a viscosity of 39.1 mPa*s and a hydrogen content of 0.72 eq SiH/kg (theoretical value=0.72 eq SiH/kg).

Example 7

Inventive 12.5 g (0.06 mol) of tetraethoxysilane (>98%, obtainable from Fluka), 10.8 g (0.06 mol) of methyltriethoxysilane (98%, obtainable from ABCR), 80.9 g of an α,ω-dihydropolydimethylsiloxane with a hydrogen content of 2.97 eq SiH/kg, 242.1 g of decamethylcyclopentasiloxane (obtainable from Gelest Inc.) and 21.2 g of the predried sulphonic acid cation exchange resin Lewatit® K 2621 (water content 10% by weight—determined based on the Karl-Fischer method) were initially charged in a four-neck flask equipped with a precision glass stirrer, an internal thermometer, a dropping funnel and a distillation apparatus with stirring at 40° C. for 2 hours. Within 5 minutes, a mixture of 7.6 g of deionized water and 1.9 g of ethanol was added dropwise with stirring, and the mixture was stirred for one hour. After adding a further 7.1 g of the predried sulphonic acid cation exchange resin Lewatit® K 2621, excess water and alcohol were distilled off in a water-jet pump vacuum of approx. 15 mbar at 40° C. for 3.5 hours. After the resin had been filtered off, a clear, colorless liquid was obtained with a viscosity of 19.6 mPa*s and a hydrogen content of 0.70 eq SiH/kg (theoretical value=0.71 eq SiH/kg).

Example 8

Inventive 12.5 g (0.06 mol) of tetraethoxysilane (>98%, obtainable from Fluka), 10.8 g (0.06 mol) of methyltriethoxysilane (98%, obtainable from ABCR), 80.9 g of an α,ω-dihydropolydimethylsiloxane with a hydrogen content of 2.97 eq SiH/kg, 242.1 g of decamethylcyclopentasiloxane (obtainable from Gelest Inc.) and 21.2 g of the predried sulphonic acid cation exchange resin Lewatit® K 2621 (water content 10% by weight—determined based on the Karl-Fischer method) were initially charged in a four-neck flask equipped with a precision glass stirrer, an internal thermometer, a dropping funnel and a distillation apparatus with stirring at 40° C., 0.42 ml of trifluoromethanesulphonic acid (obtainable from Sigma Aldrich) was added and the mixture was stirred for 2 hours. Within 5 minutes, a mixture of 7.6 g of deionized water and 1.9 g of ethanol was added dropwise with stirring, and the mixture was stirred for one hour. In a water-jet pump vacuum of approx. 15 mbar, excess water and alcohol were distilled off at 40° C. for 3.5 hours. After neutralization with 14.1 g of sodium hydrogencarbonate, a clear, colorless liquid was obtained with a viscosity of 67.6 mPa*s and a hydrogen content of 0.70 eq SiH/kg (theoretical value=0.71 eq SiH/kg).

Example 9

Noninventive 49.2 g of octyltriethoxysilane (Dynasylan® OCTEO, obtainable from Evonik Degussa GmbH), 83.9 g of an α,ω-dihydropolydimethylsiloxane with a hydrogen content of 2.97 eq SiH/kg and 112.1 g of decamethylcyclopentasiloxane (obtainable from Gelest Inc.) were admixed in a four-neck flask equipped with a precision glass stirrer, a reflux condenser and an internal thermometer with stirring with 4.8 g of deionized water and 7.0 ml of concentrated sulphuric acid and stirred at 25° C. for 10 hours. The reaction mixture was washed twice with 83 g of deionized water. The phase separation in the separating funnel took 24 hours each time. The resulting cloudy siloxane liquid was distilled in an oil-pump vacuum of approx. 2 mbar at 40° C. for 2 hours. This gave a clear, colorless liquid with a viscosity of 7.4 mPa*s and a hydrogen content of 1.09 eq SiH/kg (theoretical value=1.10 eq SiH/kg). The resulting product has a viscosity of significantly below the desired viscosity of 10 mPa*s.

Example 10

Noninventive 34.3 g of methyltriethoxysilane (98%, obtainable from ABCR), 90.1 g of an α,ω-dihydropolydimethylsiloxane with a hydrogen content of 2.97 eq SiH/kg and 120.5 g of decamethylcyclopentasiloxane (obtainable from Gelest Inc.) were admixed in a four-neck flask equipped with a precision glass stirrer, a reflux condenser and an internal thermometer with stiffing with 5.2 g of deionized water and 7.0 ml of concentrated sulphuric acid and stirred at 25° C. for 10 hours. The aqueous-ethanolic phase in sulphuric acid solution was removed from the reaction mixture, and the silicone phase was washed twice with 83 g of deionized water. The phase separation in the separating funnel took 24 hours each time. The resulting slightly cloudy siloxane liquid was distilled in an oil-pump vacuum of approx. 2 mbar at 40° C. for 2 hours. This gave a clear, colorless liquid with a viscosity of 6.2 mPa*s and a hydrogen content of 1.18 eq SiH/kg (theoretical value=1.20 eq SiH/kg). The resulting product has a viscosity of significantly below the desired viscosity of 10 mPa*s auf.

Example 11

Inventive

A 1000 ml four-neck flask with attached precision glass stirrer, reflux condenser and internal thermometer was initially charged with 48.1 g of 1-dodecene, which was heated to 90° C. and admixed with 6 ppm of platinum in the form of the Karstedt catalyst. Subsequently, 314 g of the branched hydrosiloxane prepared according to Example 3 with the hydrogen content of 0.71 eq SiH/kg were metered in within 40 min. It was ensured that the reaction temperature did not exceed 100° C. The SiH conversion determined by gas volumetric means was quantitative after 1 hour. Subsequently, the volatile constituents of the reaction mixture were distilled off at 135° C. in an oil-pump vacuum. This gave a clear liquid with a viscosity of 100 mPa*s.

Example 12

Inventive

A 500 ml four-neck flask with attached precision glass stirrer, reflux condenser and internal thermometer was initially charged with 46 g of 1-dodecene, which was heated to 90° C. and admixed with 6 ppm of platinum in the form of the Karstedt catalyst. Subsequently, 193 g of the branched hydrosiloxane prepared according to Example 5 with the hydrogen content of 1.09 eq SiH/kg were metered in within 25 min. It was ensured that the reaction temperature did not exceed 100° C. The SiH conversion determined by gas volumetric means was 99.6% after 3.5 hours. Subsequently, the volatile constituents of the reaction mixture were distilled off at 135° C. in an oil-pump vacuum. This gave a clear liquid with a viscosity of 105 mPa*s.

Example 13

Inventive

A 500 ml four-neck flask with attached precision glass stirrer, reflux condenser and internal thermometer was initially charged with 40 g of dodecanol, which was heated to 100° C. and admixed with 23 mg of tris(pentafluorophenyl)borane. Subsequently, 190 g of the branched hydrosiloxane prepared according to Example 5 with the hydrogen content of 1.09 eq SiH/kg were metered in within 2 h. The SiH conversion determined by gas volumetric means was 99.7% after 3.5 hours. Subsequently, the volatile constituents of the reaction mixture were distilled off at 135° C. in an oil-pump vacuum. This gave a clear liquid with a viscosity of 84 mPa*s.

Example 14

Inventive

A 500 ml four-neck flask with attached precision glass stirrer, reflux condenser and internal thermometer was initially charged with 202 g of a methoxy-functional allylpolyoxyalkylene with a mean molecular weight of 1557 g/mol (determined by iodine number), a propylene oxide content of 18% by weight and an ethylene oxide content of 82% by weight, together with 141 g of the branched hydrosiloxane prepared according to Example 2 with the hydrogen content of 0.71 eq SiH/kg, which were heated to 90° C. and admixed with 7 ppm of platinum in the form of Pt 92. Subsequently, the mixture was heated to 115° C. The SiH conversion determined by gas volumetric means was 99.4% after 2.25 hours. This gave a clear liquid with a viscosity of 13 480 mPa*s.

Example 15

Inventive

A 500 ml four-neck flask with attached precision glass stirrer, reflux condenser and internal thermometer was initially charged with 110 g of a methoxy-functional allylpolyoxyalkylene with a mean molecular weight of 999 g/mol (determined by iodine number), a propylene oxide content of 100% by weight, together with 242 g of the branched hydrosiloxane prepared according to Example 4 with the hydrogen content of 0.35 eq SiH/kg, which were heated to 95° C. and admixed with 7 ppm of platinum in the form of Pt 92. Subsequently, the mixture was heated to 110° C. The SiH conversion determined by gas volumetric means was complete after 1 hour. This gave a clear liquid with a viscosity of 132 mPa*s.

Example 16

Noninventive

In a 500 ml four-neck flask with attached precision glass stirrer, reflux condenser and internal thermometer, 30.0 g of the branched hydrosiloxane prepared according to Example 10 with the hydrogen content of 1.20 eq SiH/kg, 14.6 g of a methoxy-functional allylpolyoxyalkylene with a mean molecular weight of 875 g/mol (determined by iodine number), a propylene oxide content of 26% by weight and an ethylene oxide content of 74% by weight, 14.3 g of a methoxy-functional allylpolyoxyalkylene with a mean molecular weight of 1502 g/mol (determined by iodine number), a propylene oxide content of 58% by weight and an ethylene oxide content of 42% by weight and 83.7 g of a methoxy-functional allylpolyoxyalkylene with a mean molecular weight of 3905 g/mol (determined by iodine number), a propylene oxide content of 58% by weight and an ethylene oxide content of 42% by weight were heated to 70° C. with stirring. 5 ppm of platinum in the form of a platinum(0) catalyst modified according to EP 1520870 were added with a syringe. The conversion determined by gas volumetric means was quantitative after 2.5 hours. This gave a very cloudy liquid with a viscosity of 163 mPa*s.

The inventive examples demonstrate that it is possible with the process according to the invention to prepare branched Si—H-functional siloxanes, without degrading significant proportions of the theoretically expected SiH functions and without the viscosity of the resulting branched hydrosiloxanes going below 10 mPa*s and cloudiness occurring in conversion products, as is the case in the comparative examples.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A process for preparing a branched SiH-functional siloxane liquid at a temperature of 25° C. and a pressure of 101 325 Pa, said process comprising reacting in a single step a mixture that comprises
    a) one or more SiH-functional siloxanes,
    b) one or more SiH function-free siloxanes,
    c) one or more tetraalkoxysilanes, and optionally
    d) one or more trialkoxysilanes,
in the presence of added water and at least one solid, Brønsted-acidic catalyst selected from an acidic ion exchanger, wherein 0.5 to 30 mol of water per mole of alkoxysilane is used.

2. The process according to claim 1, wherein said mixture includes said one or more trialkoxysilanes.

3. The process according to claim 1, wherein said mixture excludes said one or more trialkoxysilanes.

4. The process according to claim 1, wherein the reacting is performed at a temperature of 0° C. to 100° C.

5. The process according to claim 1, wherein the acidic ion exchanger is a sulphonic acid ion exchange resin.

6. The process according to claim 1, wherein at least one non-solid, Brønsted-acidic catalyst is used in conjugation with said acidic ion exchanger.

7. The process according to claim 1, wherein the catalyst is a mixture of trifluoromethanesulphonic acid and a sulphonic acid ion exchange resin.

8. The process according to claim 1, wherein the sum total of the acidic catalysts used is from 0.01 to 20% by weight based on the sum total of the mass of starting materials used.

9. The process according to claim 1, wherein the branched SiH-functional siloxane includes SiH functions that are purely in terminal positions, purely in pendant positions or in a mixture of terminal and pendant positions in the siloxane.

10. The process according to claim 1, wherein said added water is introduced in one step.

11. The process according to claim 1, wherein said added water is metered in over a period of time.

12. The process according to claim 1, wherein said added water is present in an amount sufficient to prevent phase separation.

13. A method for preparing a branched organomodified polysiloxane, the method comprising reacting in a single step a mixture that comprises:
    a) one or more SiH-functional siloxanes,
    b) one or more SiH function-free siloxanes,
    c) one or more tetraalkoxysilanes, and optionally
    d) one or more trialkoxysilanes,
in the presence of water and at least one solid Brønsted-acidic catalyst selected from an acidic ion exchanger to afford a branched Si—H functional polysiloxane; and subsequently reacting said branched Si—H functional polysiloxane with one or more compounds having one double bond per molecule by platinum-catalyzed hydrosilylation.

14. The method according to claim 13, wherein said one or more compounds having one double bond per molecule are selected from vinylpolyoxyalkylene, allylpolyoxyalkylene, and a mixture thereof.

15. A method for preparing a branched organomodified polysiloxane, the method comprising reacting in a single step a mixture that comprises:
    a) one or more SiH-functional siloxanes,
    b) one or more SiH function-free siloxanes,
    c) one or more tetraalkoxysilanes, and optionally
    d) one or more trialkoxysilanes,
in the presence of water and at least one solid Brønsted-acidic catalyst selected from an acidic ion exchanger to afford a branched Si—H functional polysiloxane; and subsequently reacting said branched Si—H functional polysiloxane with one or more compounds having one hydroxyl group per molecule by Lewis acid-catalyzed dehydrogenative bond formation.

* * * * *